United States Patent [19]

Nakanishi

[11] Patent Number: 5,027,247
[45] Date of Patent: Jun. 25, 1991

[54] FILM MAGNETIC HEAD FOR HIGH FREQUENCY RECORDING

[75] Inventor: Kanji Nakanishi, Kanagawa, Japan

[73] Assignee: Fuji Photo Film Co., Ltd., Kanagawa, Japan

[21] Appl. No.: 265,380

[22] Filed: Oct. 31, 1988

[30] Foreign Application Priority Data

Oct. 29, 1987 [JP] Japan .................................. 62-271823
Nov. 6, 1987 [JP] Japan .................................. 62-279360

[51] Int. Cl.$^5$ ............................................ G11B 5/147
[52] U.S. Cl. ................................................... 360/126
[58] Field of Search ............... 360/126, 125, 127, 122, 360/113

[56] References Cited

U.S. PATENT DOCUMENTS

| 4,103,315 | 7/1978 | Hempstead et al. | 360/127 X |
| 4,316,228 | 2/1982 | Fujiwasa et al. | 360/127 |
| 4,450,494 | 5/1984 | Fujiwasa et al. | 360/125 |
| 4,571,652 | 2/1986 | Fujiwasa et al. | 360/122 |
| 4,604,670 | 8/1986 | Visser | 360/127 |

Primary Examiner—David J. Severin
Attorney, Agent, or Firm—Sughrue, Mion, Zinn, Macpeak & Seas

[57] ABSTRACT

A film magnetic head in which a soft metal magnetic film having uniaxial magnetic anisotropy is employed as a magnetic pole material, and a magnetic circuit having a magnetic path direction substantially perpendicular to the easy axis direction thereof is provided. The magnetic head records and reproduces signals having frequencies of 1 MHz and higher. According to a first embodiment of the invention the length W of a magnetic pole film in the easy axis direction forming a magnetic path is defined as follows:

$$0.2 \leq d/W \leq 0.3, \text{ or } d/W \leq 0.15,$$

where d is the 180° magnetic domain wall distance in the magnetic pole film. Alternatively, the length W of a magnetic pole film in the easy axis direction forming a magnetic path and the uniaxial anisotropic constant Ku is defined as follows:

$$50 \ \mu m \leq W \leq 200 \ \mu m \text{ and } 100 \ J/m^3 \leq Ku \leq 400 \ J/m^3,$$
or
$$700 \ \mu m \leq W, \text{ and } Ku \leq 300 \ J/m^3.$$

Thus, the magnetic permeability of the magnetic core in the high frequency range is improved, and therefore the signal recording and reproducing efficiency is excellent.

4 Claims, 6 Drawing Sheets

HEAD A MAGNETIC POLE SHAPE

UPPER MAGNETIC POLE

LOWER MAGNETIC POLE

MAGNETIC GAP

W=100μm

HEAD A MAGNETIC POLE SHAPE

HEAD B MAGNETIC POLE SHAPE

HEAD C, D, E MAGNETIC POLE SHAPE

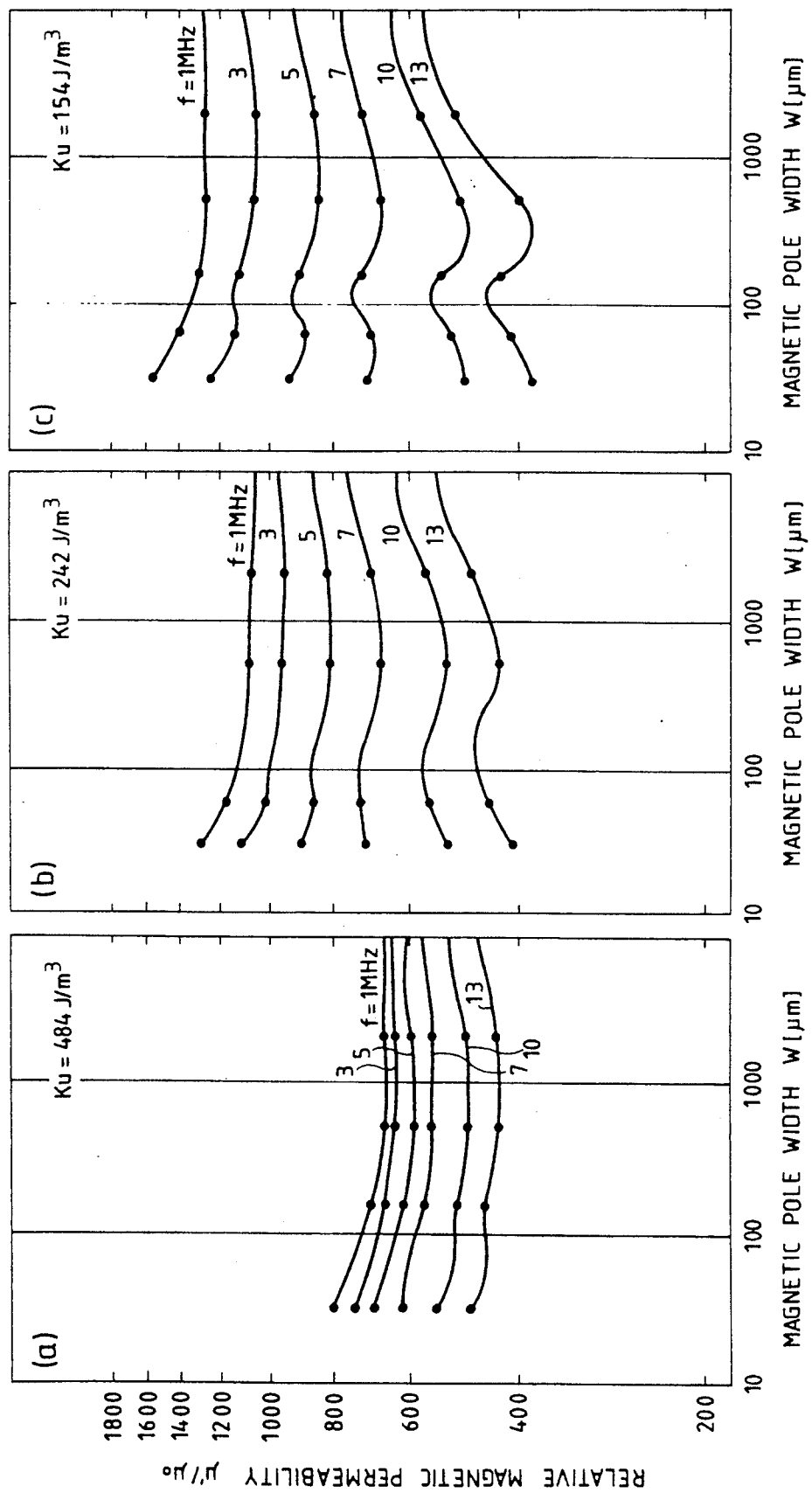

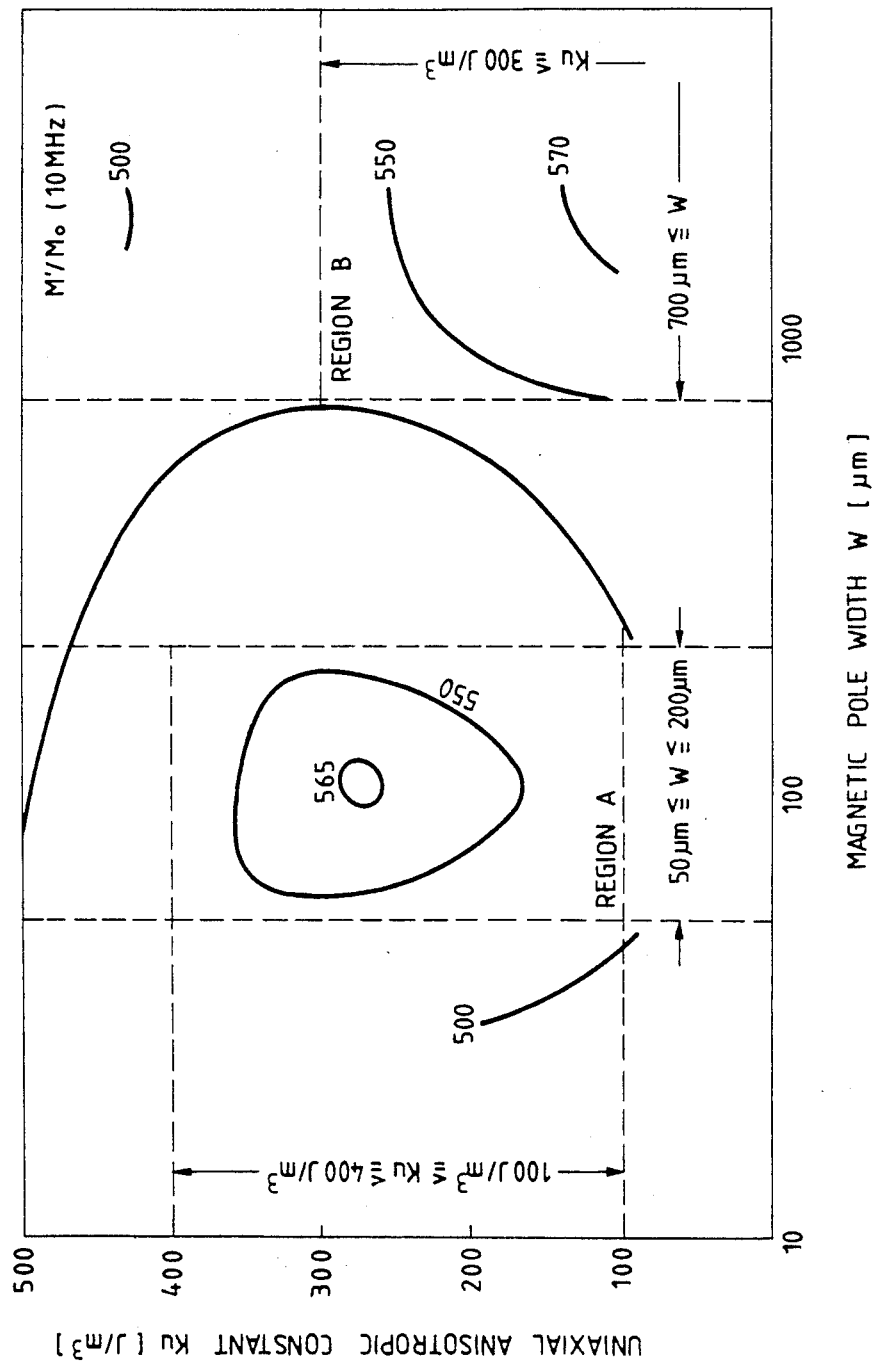

FILM MAGNETIC HEAD FOR HIGH FREQUENCY RECORDING

BACKGROUND OF THE INVENTION

1. Field of the Industrial Application

This invention relates to a film magnetic head which provides a high reproduction output suitable for use in high density magnetic recording.

2. Description of the Prior Art

A film magnetic head has been developed to increase the magnetic recording density and the frequency at which a magnetic recording medium such as a magnetic disc and a magnetic tape may be used. An induction type film magnetic head base on electromagnetic induction comprises upper and lower magnetic pole films which form a magnetic circuit with a magnetic gap. A coil conductor film which crosses the magnetic circuit, and insulating films for magnetically and electrically insulating coils from one another and a magnetic pole and a coil from each other are provided. These films are formed and laminated using a film forming technique and a precision machining method.

In addition, a magnetoresistance effect type (or MR type) film magnetic head has been proposed in which a magnetoresistance effect element is provided in a magnetic circuit formed by a magnetic core similar to that described above.

In general, these film magnetic heads employ a small magnetic core made up of a soft metal magnetic film. Accordingly, in these film magnetic heads, the magnetic core loss at high frequency, such as eddy current loss is low, and the magnetic circuit is compact in comparison to bulk type magnetic heads. This results in an improvement in the recording and reproducing efficiency in a magnetic recording and reproducing operation over a wide range of frequencies. On the other hand, the induction type film magnetic head is made up of a small magnetic core and a small winding, and therefore it is a low impedance magnetic head suitable for a high frequency, high density magnetic recording operation.

The electromagnetic conversion characteristic of such a film magnetic head depends heavily on the magnetic characteristic of the magnetic pole film employed. That is, a magnetic pole film high in saturated flux density is necessary for recording signals on a high coercive force medium in order to permit the recording of short wavelengths, and in order to efficiently record and reproduce high frequency signals with high fidelity, a high magnetic permeability should exist with a high frequency range.

In order to improve the magnetic permeability with the high frequency range, in the magnetization process a magnetization revolution with high switching speed should be employed rather than a magnetic domain wall movement. Accordingly, it is necessary that a uniaxial magnetic anisotropy be established in the magnetic film so that the easy axis is aligned in the track widthwise direction of the film magnetic head, whereby the hard axis direction coincides with the excitation direction.

If the uniaxial magnetic anisotropy is excessively large, then the gradient of the magnetization curve along the hard axis direction decreases. If on the other hand, the uniaxial magnetic anisotropy is excessively small, then magnetic domain wall movement is liable to occur, resulting in a decrease in the magnetic permeability in the high frequency range. That is, although the most suitable uniaxial magnetic anisotropy exists, the most suitable conditions for achieving it cannot be determined simply, since it depends not only on the uniaxial magnetic anisotropy but also on the configuration of the magnetic core in the magnetic head.

SUMMARY OF THE INVENTION

In view of the foregoing, an object of this invention is to provide a film magnetic head in which the magnetic permeability of its magnetic core in the high frequency range is improved to provide high recording and reproducing efficiency.

In order to provide a film magnetic head having high recording and reproducing efficiency in the high frequency range, it is essential that a uniaxial magnetic anisotropy suitable for the configuration of the magnetic core be determined.

The foregoing objects of the invention have been achieved by the provision of a film magnetic head in which a soft metal magnetic film having uniaxial magnetic anisotropy is employed as a magnetic pole material, and a magnetic circuit having a magnetic path direction substantially perpendicular to the easy axis direction thereof. The magnetic head records and reproduces signals having frequencies of 1 MHz and higher. According to a first embodiment of the invention the length W of a magnetic pole film in the easy axis direction forming a magnetic path is defined as follows:

$$0.2 \leq d/W \leq 0.3, \text{ or } d/W \leq 0.15,$$

where d is the 180° magnetic domain wall distance in the magnetic ̇e film.

In addition, according to a second embodiment of the invention the length W of a magnetic pole film in the easy axis direction forming a magnetic path and the uniaxial anisotropic constant Ku is defined as follows:

$$50 \, \mu m \leq W \leq 200 \, \mu m, \text{ and } 100 \, J/m^3 \leq Ku \leq 400 \, J/m^3,$$
or
$$700 \, \mu m \leq W, \text{ and } Ku = 300 \, J/m^3.$$

In the film magnetic heads according to these embodiments, the magnetic permeability of the magnetic core in the high frequency range is improved, and therefore the signal recording and reproducing efficiency is excellent.

BRIEF DESCRIPTION OF THE DRAWINGS

FIG. 8 is a graphical representation showing magnetic pole width with relative magnetic permeability according to the second embodiment of the invention.

FIG. 9 is a graphical representation showing in combination the magnetic pole width, uniaxial anisotropic constant, and relative magnetic permeability, according to the second embodiment of the present invention.

DETAILED DESCRIPTION OF THE PREFERRED EMBODIMENTS

Figure 1:
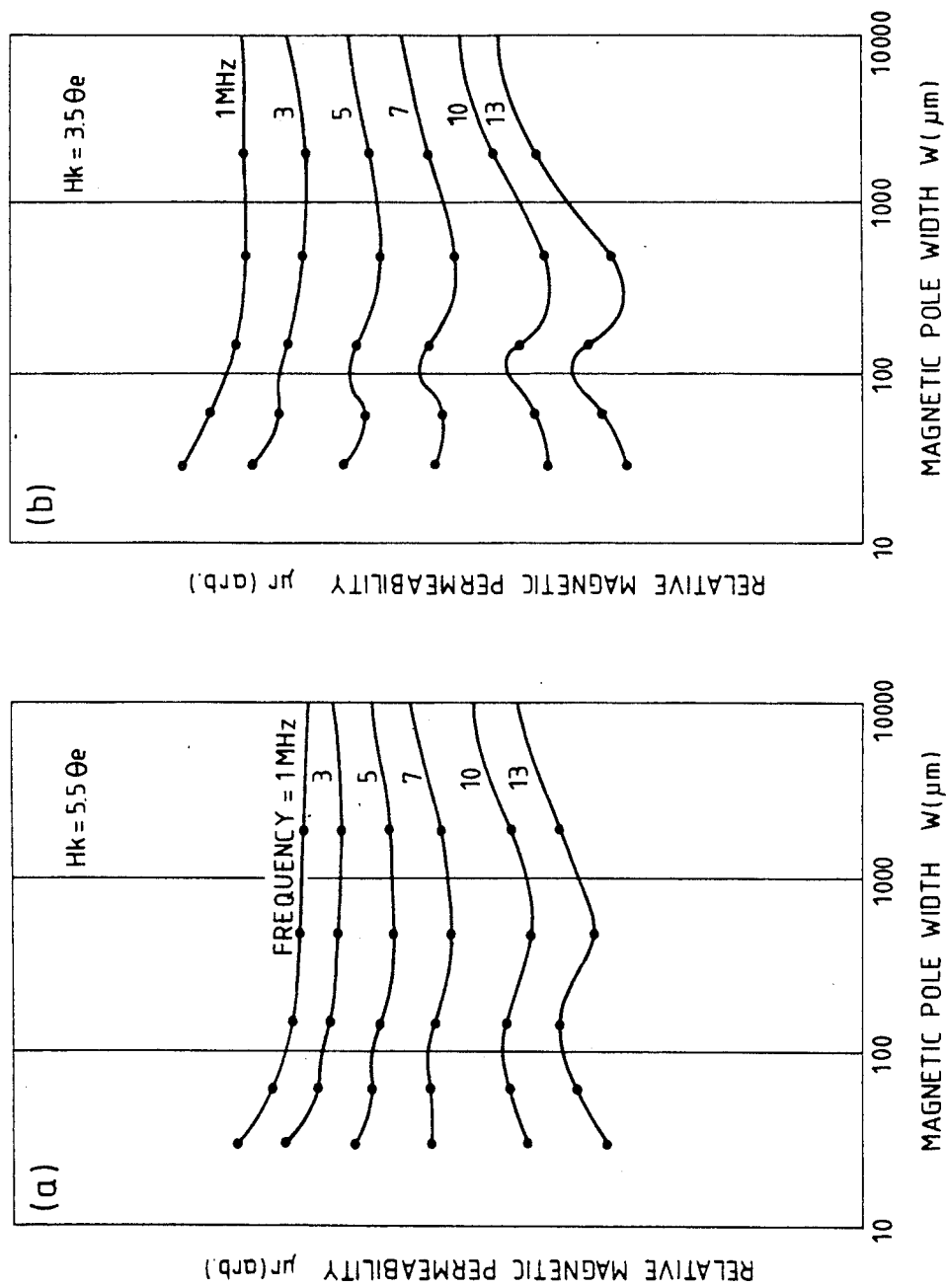
FIG. 1 is a graphical representation showing magnetic pole width with relative magnetic permeability according to a first embodiment.

A variety of experiments have been performed focusing on the fact that the structure of the magnetic domain of a magnetic head affects the reproduction output. For instance, a report on a vertical magnetic head by Yamakawa et al ("Single Magnetic Pole Type Narrow Track Vertical Magnetic Head", Electronic Communications Society Technical Research Report Magnetic Record MR 84-28 (1984) 7) is available. According to this report, in a single magnetic pole type vertical magnetic head having a magnetic pole thickness of 0.3 $\mu$m, a reflux magnetic domain is clearly observed. The maximum sensitivity is obtained when the ratio (2 h/w) of the length 2 h, in a track widthwise direction, of a reflux magnetic domain formed at both ends of a track, to a track width w equals 30 to 40%. This relation is independent of material constants (such as anisotropic energy Ku, and exchange constant A).

However, it should be noted that these conditions are established using a film in which a reflux magnetic domain is clearly observed, and the frequency employed is limited to a relatively low frequency on the order of 80 KHz.

According to one application of the present invention, in a signal recording or reproducing operation using an electronic still camera with a floppy disk, the magnetic pole of a magnetic head must be magnetized with a signal of up to 15 or 16 MHz. Since the thickness of the magnetic pole is on the order of 10 $\mu$m, the magnetic domain structure is not always a clear closure magnetic domain structure or a three-dimensional magnetic domain structure. In the future, in order to record and reproduce signals with higher density and higher quality, higher signal frequency may be employed, and therefore it is necessary to develope a magnetic material and magnetic pole configuration which will improve the recording and reproduction efficiency of the film magnetic head at frequencies higher than 1 MHz.

In view of the foregoing, the following experiments were carried out to investigate the above-described condition. A number of stripe-shaped magnetic poles 30 $\mu$m to 10 mm in magnetic pole width (hereinafter referred to merely as "W" when applicable), 30 mm in length, and 12 $\mu$m in thickness, each having an easy axis in the direction of the magnetic pole width, were formed on a substrate. Then the effects of different anisotropic magnetic fields (hereinafter referred to as "Hk" when applicable) and different W's on relative magnetic permeabilities $\mu$r and magnetic domain structures with frequencies of 1 to 13 MHz were investigated. The magnetic pole material was a $Co_{91.8}Nb_{5.9}Zr_{2.3}$ sputtering film. The film was thermally treated to control the anisotropy, and then shaped as required by dry etching with an ion beam. The saturated magneto-striction $\lambda$s of the film was about $+3 \times 10^{-7}$. A substrate, PEG 3120C manufactured by HOYA (Co. Ltd.), having a thermal expansion coefficient substantially equal to that of the film was used to prevent the influence of the magnetic elastic effect which depends, for instance, on the pattern. Each of the relative magnetic permeabilities resulted from the change in inductance of the respective pattern placed in the coil. The effects of the demagnetizing fields were corrected by calculation. The magnetic domain structures were observed by the bitter pattern method.

The sections (a) and (b) of FIG. 1 show $\mu$r with W respectively with Hk=5.5 $\theta$e and Hk=3.5 $\theta$e. As is apparent from the sections (a) and (b) of FIG. 1, when the frequency is low (for instance 1 MHz), $\mu$r increases with decreasing W. However, when the frequency is high, $\mu$r depends intricately on W. For instance in the case of Hk=3.5 $\theta$e, at high frequencies $\mu$r is at a maximum with W=100 $\mu$m, and minimum near W=300 $\mu$m, and in a wider range of W, $\mu$r increases with increasing W.

Therefore, in order to prevent the decrease of $\mu$r with high frequencies in the case of Hk=3.5 $\theta$e, it is necessary to set W to about 100 $\mu$m or to make W wider than 1 mm.

Through the observation of the magnetic domains, it has been found that the magnetic domain structures have closure magnetic domains on the side of W which is narrower than the W with which $\mu$r becomes maximum, and the closure magnetic domains become unclear or are Lifshitz type on the side of W which is wider.

Therefore, $\mu$r is not determined solely by the anisotropy alone, but rather depends on the magnetic domain structure obtained from the combination of the magnetic pole configuration and the anisotropy.

Figure 2:
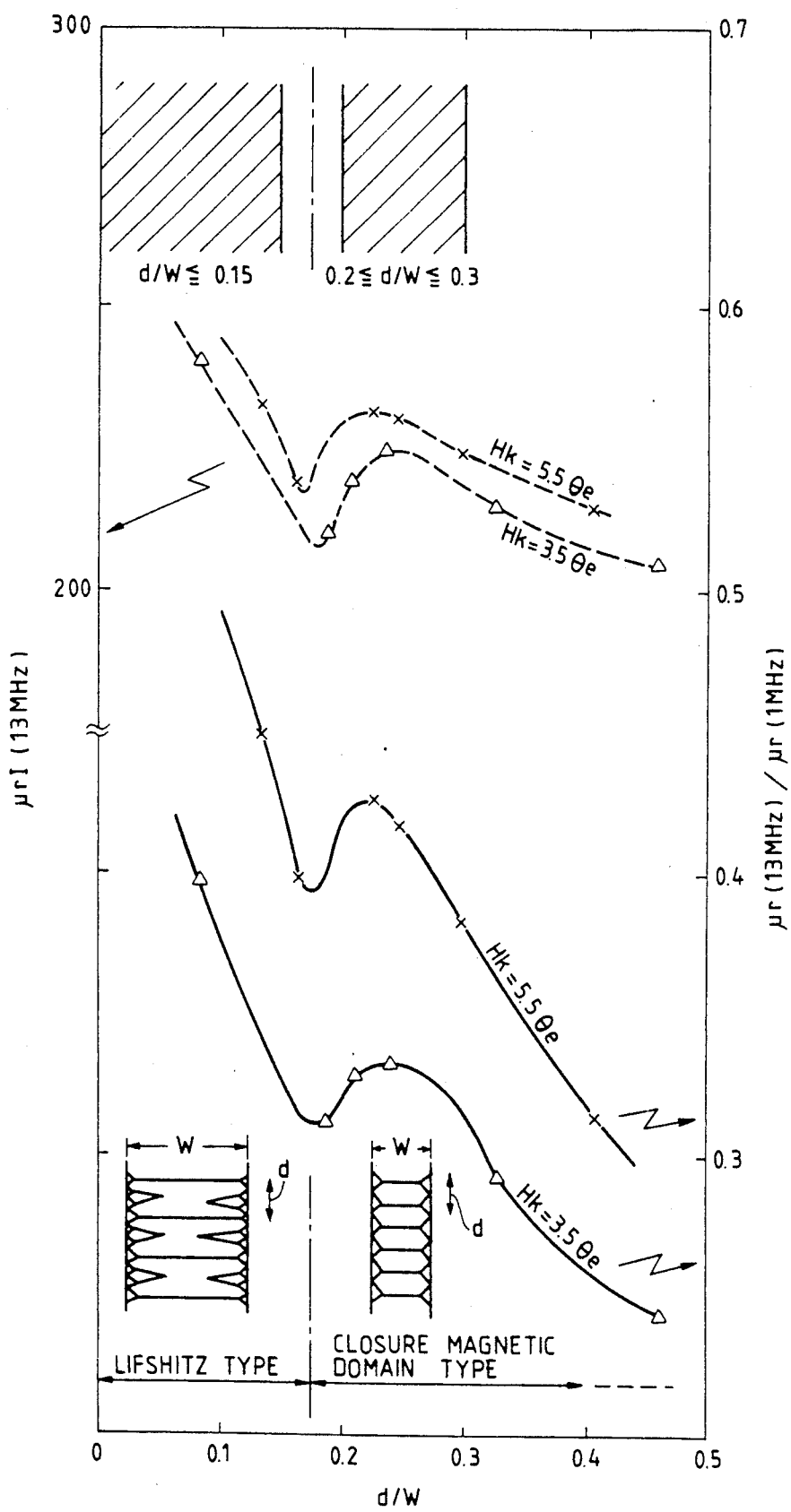
FIG. 2 is a graphical representation showing relative magnetic permeabilities with ratios (d/W) of 180° magnetic wall distance (d) to magnetic pole length (W) according to the first embodiment.

FIG. 2 shows the results of the above-described experiments with the magnetic domain structures. In FIG. 2, the horizontal axis represents the ratio (d/W) of a 180° magnetic domain wall distance (d) to a magnetic pole width (W), and the vertical axes represents $\mu$r with 13 MHz, and the ratio of $\mu$r of 13 MHz to $\mu$r of 1 MHz. As is apparent from FIG. 2, regardless of the value of Hk, both the magnetic permeability with high frequency and the frequency characteristic of the magnetic permeability are satisfactory when the value d/W is in a range of 0.2 to 0.3, or less than or equal to 0.15.

As a result, if d/W is selected so that it falls within the above-described range, than a film magnetic head showing an excellent recording and reproducing efficiency over a wide range of frequencies is obtained. In this connection, it is not always necessary that the value of d/W remain constant in all parts of the magnetic circuit in one film magnetic head. In other words, different d/W may be provided for different parts of the magnetic circuit in the magnetic head if the d/W are in the above described range. For instance, a film magnetic head having magnetic poles with d/W=0.3 and d/W=0.9 will show the effect of the invention. Concrete examples of a film magnetic head manufactured according to the above described conditions will be described in order to provide a full understanding of the present invention.

EXAMPLE 1

Figure 3:
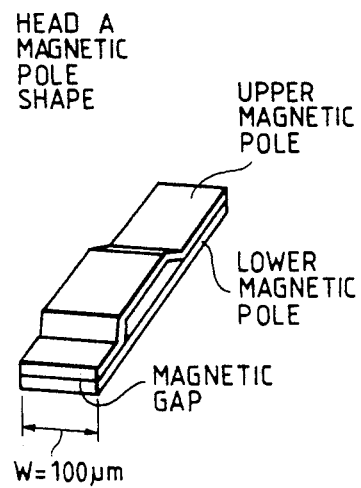
FIGS. 3 and 4 are explanatory diagrams showing the configuration of the magnetic cores in examples of a film magnetic head according to both embodiments of the invention.
Figure 4:
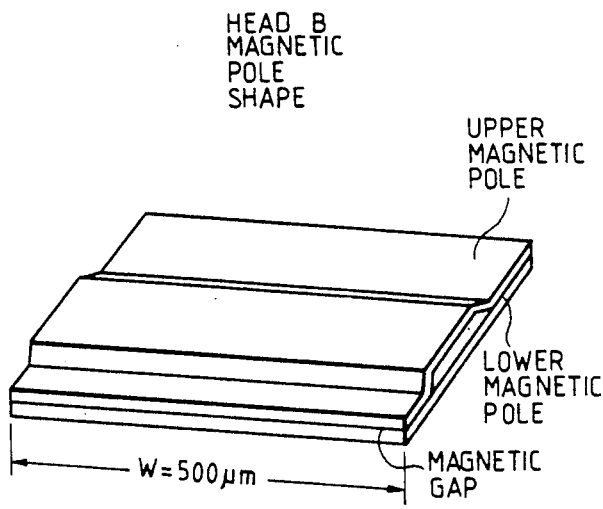
Figure 5:
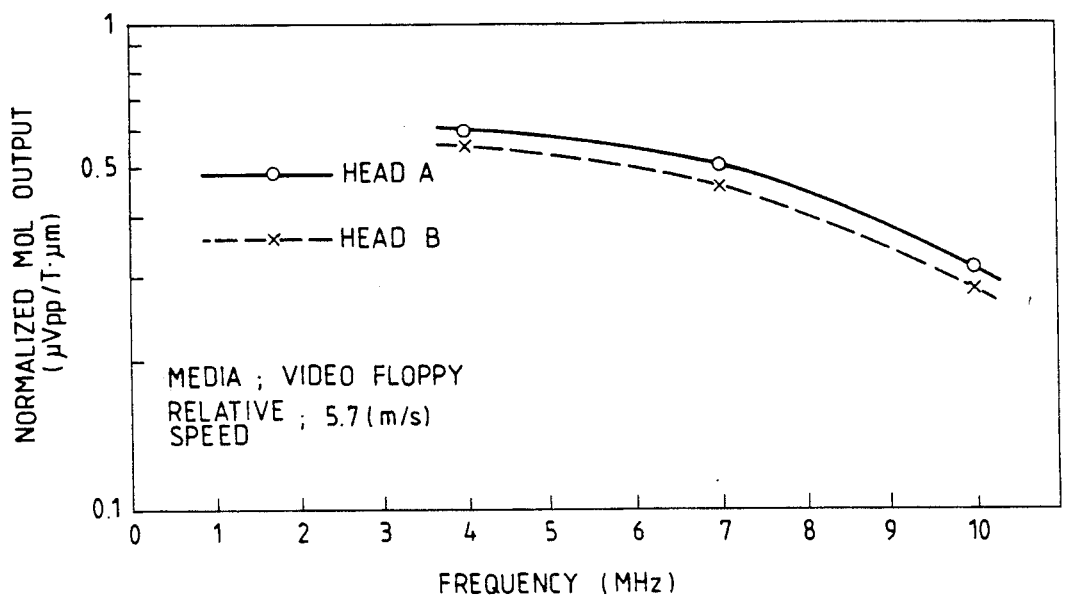
FIG. 5 is a graphical representation indicating the frequency characteristics of the standard self recording and reproducing outputs of the examples of the film magnetic head according to both the first and second embodiments of the invention.

FIG. 3 shows the configuration of the magnetic poles of a first concrete example of a thin film magnetic head according to the invention. The magnetic pole material employed was an amorphous soft magnetic alloy of $Co_{91.8}Nb_{5.9}Zr_{2.3}$, and the magnetic pole thickness was set to 12 μm. Anisotropy was established in the magnetic pole widthwise direction, and it Hk was 5.5 θe. The d/W of the head (head A) was 0.25. For the purpose of comparison, a film magnetic head whose magnetic pole configuration is shown in FIG. 4 was manufactured. The d/W of this magnetic head (head B) was 0.17. The standardized self recording and reproducing outputs of these two heads are shown in FIG. 5. As shown in FIG. 5, the film magnetic head (head A) with W=100 μm and width d/W in a range of 0.2 to 0.3 is higher in efficiency.

EXAMPLE 2

Figure 6:
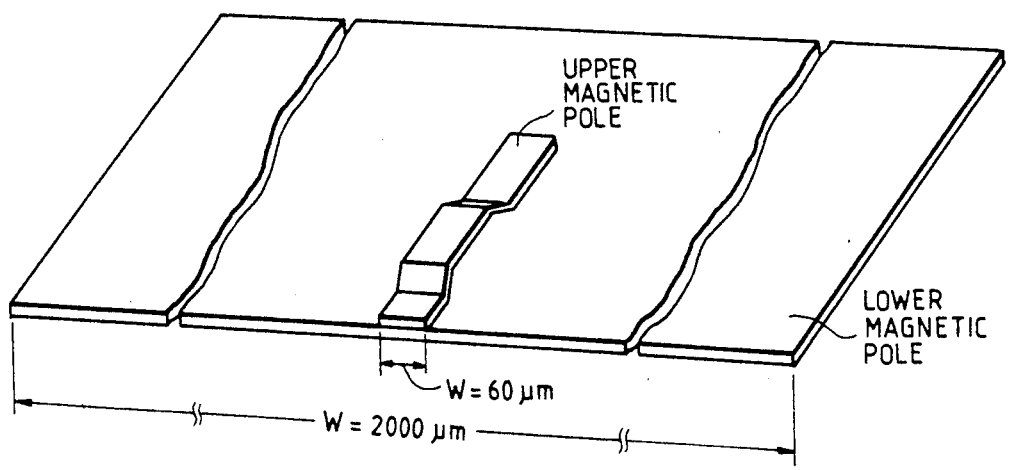
FIG. 6 is an explanatory diagram showing the configuration of the magnetic core in an examples of a film magnetic head according to the first embodiment of the invention.

FIG. 6 shows the configuration of the magnetic poles of a second concrete example of a thin film magnetic head according to the invention. The magnetic pole material and the film thickness were equal to those of the first example described above. In the head the width of the lower magnetic pole was 2 mm. However, the recording and reproducing track width was 60 μm which was also the width of the upper magnetic pole. The anisotropy was established in the track widthwise direction. Under these conditions, a film magnetic head (head C) in which the Hk of the upper magnetic pole and the Hk of the lower magnetic pole were both 5.5. θe, a film magnetic head (head D) in which the Hk of the upper magnetic pole was 5.5 θe and the Hk of the lower magnetic pole was 3.5 θe, and a film magnetic head (head E) for comparison purposes, in which the Hk of the upper magnetic pole was 3.5 θe and th Hk of the lower magnetic pole was 5.5 θe were manufactured.

Figure 7:
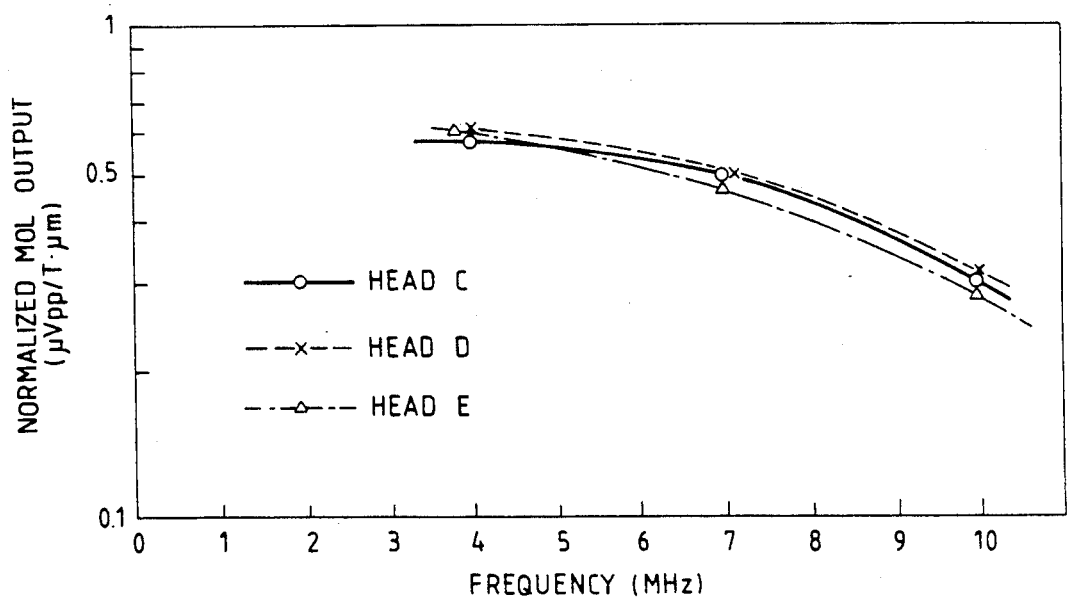
FIG. 7 is a graphical representation indicating the frequency characteristics of the standard self recording and reproducing outputs of the examples of the film magnetic head according to the first embodiment of the invention.

The d/W of the lower magnetic poles of the heads C and E were 0.11. The d/W of the upper magnetic poles of the the heads C and D were 0.3. The d/W of the upper magnetic pole of the head E was 0.33. The d/W of the lower magnetic pole of the head D was 0.09. The normalized self recording and reproducing outputs of these three heads are shown in FIG. 7. As is apparent from FIG. 7, the output of the head E whose d/W is not in the above-described range is satisfactory at 4 MHz, but is lower at higher frequencies. Both heads C and D have d/W within the above-described range, and head D, which has a lower magnetic pole d/W, has a higher output as shown.

The second embodiment of the present invention will now be described. As shown in FIG. 8, sections (a), (b) and (c) show μr with W respectively with Ku=484 J/m³, Ku=242 J/m³ and Ku=152 J/m³. In the case where Ku=484 J/m³, μr is low with all W's, because the gradient of the magnetization curve in the difficult axis direction is small. In each case where Ku=242 J/m³ and Ku=152 J/m³, when the frequency is low (for instance 1 MHz), μr increases with decreasing W. However, when the frequency is high, μr depends intricately on W. For instance in the case of Ku=152 J/m³, at high frequencies μr is at a maximum with W=100 μm, and minimum near W=300 μm, and in a wider range of W, μr increases with increasing W.

Therefore, in order to prevent the decrease of μr with high frequencies in the case of Ku=154 J/m³, it is necessary to set W to about 100 μm or to make W wider than 1 mm.

Through the observation of the magnetic domains, it has been found that the magnetic domain structures have a closure magnetic domains on the side of W which is narrower than the W with which μr becomes maximum, and the closure magnetic domains become unclear or are Lifshitz type on the side of W which is wider.

Therefore, μr is not determined solely by the anisotropy alone, but rather depends on the magnetic domain structure obtained from the combination of the magnetic pole configuration and the anisotropy.

FIG. 9 shows uniaxial anisotropic constant Ku with magnetic permeability at 10 MHz. As shown in FIG. 9, two regions with high magnetic permeability show the best characteristics for subsequent use. That is, the following two regions about 550 or higher in magnetic permeability are available:

Region A $50 \mu m \leq W \leq 200 \mu m$, and $100 J/m^3 \leq Ku \leq 400 J/m^3$, Region B $700 \mu m \leq W$, and $Ku \leq 300 J/m^3$.

With a magnetic permeability of less than 10 MHz, $\mu'/\mu o$ is more than 550.

Therefore if W and Ku are selected so that they fall within the above-described ranges, then a film magnetic head showing an excellent recording and reproducing efficiency over a wide range of frequencies is obtained. In this connection, it is not always necessary that W and Ku remain constant in all parts of the magnetic circuit in one film magnetic head. In other words, different W and Ku may be provided for different parts of the magnetic circuit in the magnetic head if they are in the above described ranges.

A concrete example of a film magnetic head manufactured according to the above described conditions will be described in order to provide a full understanding of the present invention.

EXAMPLE 3

Referring again to FIG. 3, the configuration of the magnetic poles, an example of a thin film magnetic head according to second embodiment of the invention, will now be described. The magnetic pole material employed was an amorphous soft magnetic alloy of $Co_{91.8}Nb_{5.9}Zr_{2.3}$, and the magnetic pole thickness was set to 12 μm. The anisotropy was established in the magnetic pole widthwise direction, and its Ku was 242 J/m³. The magnetic pole width W of the head (head A) was 100 μm and thus within the above-described range. For the purpose of comparison, a film magnetic head (head B) whose magnetic pole configuration is shown in FIG. 4. was manufactured. The magnetic head B was different from head A only with regard to magnetic pole width W. The magnetic pole width W of the head B was 500 μm, which is outside of the above-described range. The normalized self recording and reproducing outputs of these two heads are shown in FIG. 5. As shown in FIG. 5, the film magnetic head A is more efficient than head B.

As was described above, in the film magnetic head, the selection of the magnetic pole configuration and the material constants (such as anisotropy energy and exchange constant) of the magnetic pole material so that they meet the above-described conditions of the present invention can improve the efficiency of recording and reproduction of signals having frequencies of 1 MHz and higher.

What is claimed is:

1. A film magnetic head capable of recording and reproducing frequencies of at least 1 MHz, comprising:
   magnetic pole film material made of a soft metal magnetic film having a uniaxial magnetic anisotropy; and
   a magnetic circuit having a magnetic path direction substantially perpendicular to the easy axis direction of said head, said magnetic circuit being disposed in said head,
   wherein the length W of said magnetic pole material in an easy axis direction of said head is defined as follows:

$0.2 \leq d/W \leq 0.3$, where d is a 180° magnetic domain wall distance in said magnetic pole film.

2. A film magnetic head capable of recording and reproducing frequencies of at least 1 MHz, comprising:
   magnetic pole film material made of a soft metal magnetic film having a uniaxial magnetic anisotropy; and
   a magnetic circuit having a magnetic path direction substantially perpendicular to the easy axis direction of said head, said magnetic circuit being disposed in said head,
   wherein the length W of said magnetic pole material in an easy axis direction of said head is defined as follows:

$d/W \leq 0.15$, where d is a 180° magnetic domain wall distance in said magnetic pole film.

3. A film magnetic head capable of recording and reproducing frequencies of at least 1 MHz, comprising:
   magnetic pole film material made of a soft metal magnetic film having a uniaxial magnetic anisotropy; and
   a magnetic circuit having a magnetic path direction substantially perpendicular to the easy axis direction of said head, said magnetic circuit being disposed in said head,
   wherein the length W of said magnetic pole material in an easy axis direction of said head, and a uniaxial anisotropic constant Ku are defined as follows:

$50 \ \mu m \leq W \leq 200 \ \mu m$, and $100 \ J/m^3 \leq Ku \leq 400 \ J/m^3$.

4. A film magnetic head capable of recording and reproducing frequencies of at least 1 MHz, comprising:
   magnetic pole film material made of a soft metal magnetic film having a uniaxial magnetic anisotropy; and
   a magnetic circuit having a magnetic path direction substantially perpendicular to the easy axis direction of said head, said magnetic circuit being disposed in said head,
   wherein the length W of said magnetic pole material in an easy axis direction of said head, and a uniaxial anisotropic constant Ku are defined as follows:

$700 \ \mu m \leq W$, and $Ku \leq 300 \ J/m^3$.

* * * * *